United States Patent [19]

Kimberlin

[11] Patent Number: 5,307,881
[45] Date of Patent: May 3, 1994

[54] FLUSHING SYSTEM FOR A PERCUSSIVE, FLUID-ACTIVATED APPARATUS

[75] Inventor: Robert R. Kimberlin, Troutville, Va.

[73] Assignee: Ingersoll-Rand Company, Woodcliff Lake, N.J.

[21] Appl. No.: 955,616

[22] Filed: Oct. 2, 1992

[51] Int. Cl.[5] ............................................. B25D 17/22
[52] U.S. Cl. ..................................... 173/62; 173/73; 173/74; 173/78; 173/199
[58] Field of Search ....................... 173/62, 63, 64, 68, 173/73, 74, 78, 199

[56] References Cited

U.S. PATENT DOCUMENTS

| | | | |
|---|---|---|---|
| 752,819 | 2/1904 | Brothers | 173/199 |
| 830,744 | 9/1906 | Shaw | |
| 1,003,018 | 9/1911 | Waugh | |
| 1,551,098 | 8/1925 | Gilman | |
| 1,558,303 | 10/1925 | Smickle | 173/63 |
| 1,614,026 | 1/1927 | Gartin | |
| 1,692,934 | 11/1928 | Gartin | |
| 1,700,418 | 1/1929 | Penberthy | |
| 1,703,841 | 1/1929 | Gartin | |
| 2,003,121 | 5/1935 | Schorle | 173/62 X |
| 2,251,224 | 7/1941 | Curtis | 173/63 |
| 2,784,701 | 3/1957 | O'Farrell | |
| 3,132,703 | 5/1964 | Larcen | |
| 4,854,393 | 8/1989 | Palet | 173/74 X |

Primary Examiner—Rinaldi Rada
Attorney, Agent, or Firm—John J. Selko

[57] ABSTRACT

A debris flushing system for a percussive, fluid-activated apparatus includes a first and second separate and independent flushing system in the apparatus, each flushing system having a separate combination of passageways in the apparatus for fluid communication between an inlet port and a front piston exhaust chamber. Each flushing system has a separate seal and throttle combination for opening and closing its own passageways. A third, independent flushing system for flushing water can be added to the apparatus.

13 Claims, 4 Drawing Sheets

FLUSHING SYSTEM FOR A PERCUSSIVE, FLUID-ACTIVATED APPARATUS

BACKGROUND OF THE INVENTION

This invention relates generally to percussive, fluid-activated tools, and more particularly to systems used for flushing away debris caused by air-activated jackhammers. The function of flush air in a rock drill or jackhammer is to supply the drill steel with sufficient quantities of air to clean the dust and rock fragments from the front of the drilling bit. In some cases, water is also provided to prevent dust particles from becoming airborne. Typical drill construction provides air as the standard flushing method and water as an option. Consequently, both systems are not usually constructed from a unique set of parts.

The flush air is supplied to the drill steel usually through some type of rotary valve system with timed holes. The timing of the holes in the valve is usually such that air is supplied to the flush function as the drill operates. There is no flush system that is independent of, and in addition to, the flush system used for the percussive air that operates the drill.

If water is also used in the flush system, variations of the entire geometry are required in order to properly manage the water.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a debris flushing system for a fluid-activated drilling apparatus having a percussive fluid inlet port in a backhead of the apparatus, a first fluid flushing system in the apparatus for percussively operating the apparatus and for exhausting debris, a second fluid flushing system in the apparatus for exhausting debris, the first and second flushing systems being separate and independent from each other.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
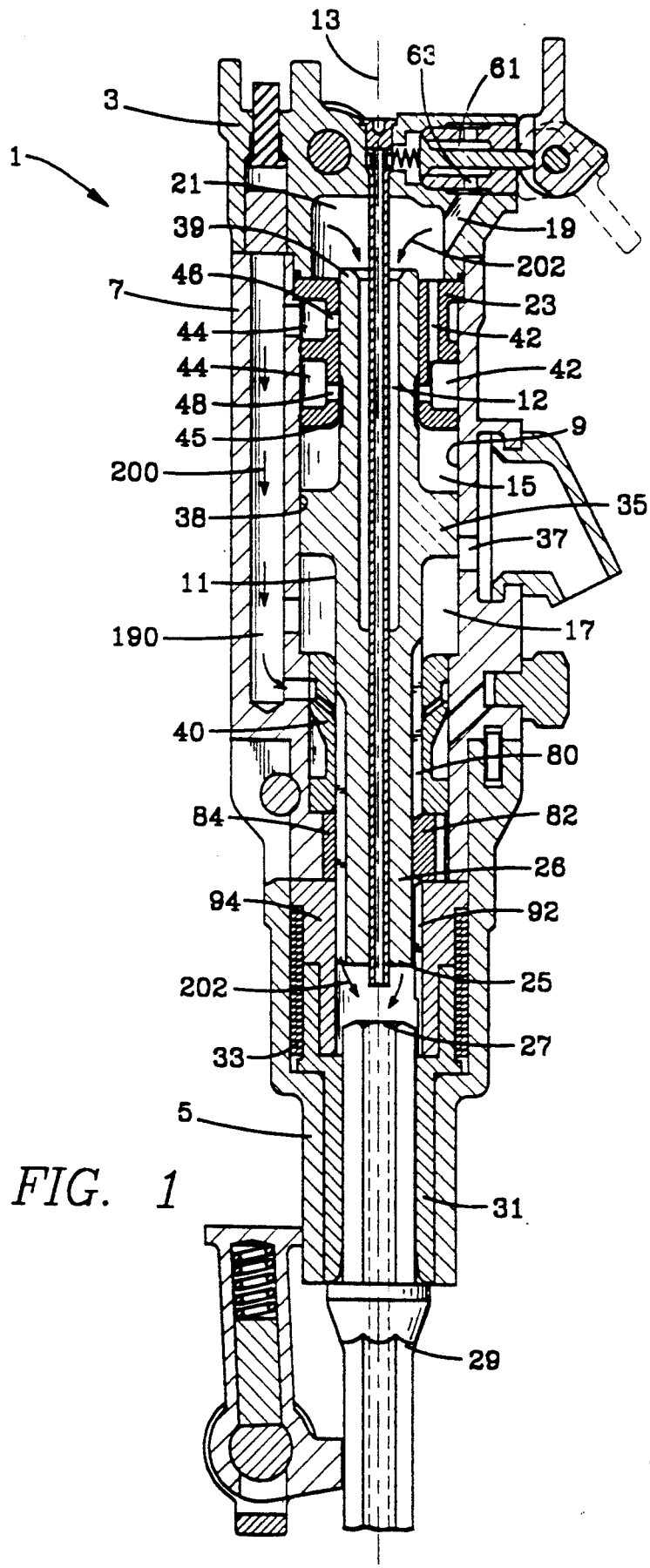
FIG. 1 is a side elevational view, in cross section, with parts removed, of a jackhammer of this invention.

Referring to the drawings, FIG. 1 shows a percussive, fluid-activated jackhammer 1 having a backhead 3 at a top end thereof, a fronthead 5 at a bottom end and a housing 7 therebetween forming a central bore 9. Piston 11 reciprocates back and forth along a longitudinal axis 13 through bore 9 between a drive chamber 15 and a return chamber 17. Piston 11 is activated by compressed air that enters into drive and return chambers, 15 and 17, respectively by way of passageway 19, first accumulator chamber 21, and air distributor 23, as is well known. As piston 11 reciprocates, front end 25 of piston stem 26 strikes against the top end 27 of a drill steel 29 slidably mounted in chuck 31 in fronthead 5. Means for causing rotation of drill steel 29 are positioned in fronthead 5, and in this case, rotation is caused by a wrap spring clutch mechanism, shown generally as 33. As piston head 35 reciprocates back and forth, it alternately exposes drive chamber and return chamber 15, 17 to an exhaust port 37 in housing 7, as is well known.

Piston 11 is supported for longitudinal reciprocation in housing 7 by housing body member 38 contacting piston head 35, air distributor 23 contacting piston tail 39 and piston stem bearing 40 contacting piston stem 26, as is well known.

Percussive fluid is introduced into first accumulator chamber 21 in backhead 3, and is directed by distributor 23 to fluid passageways 42, 44, 45 and ports 46, 48 to drive chamber 15 and thereafter to a return chamber 17. The exact arrangement of passageways can vary from the preferred arrangement herein, according to the teachings of the prior art.

Figure 2:
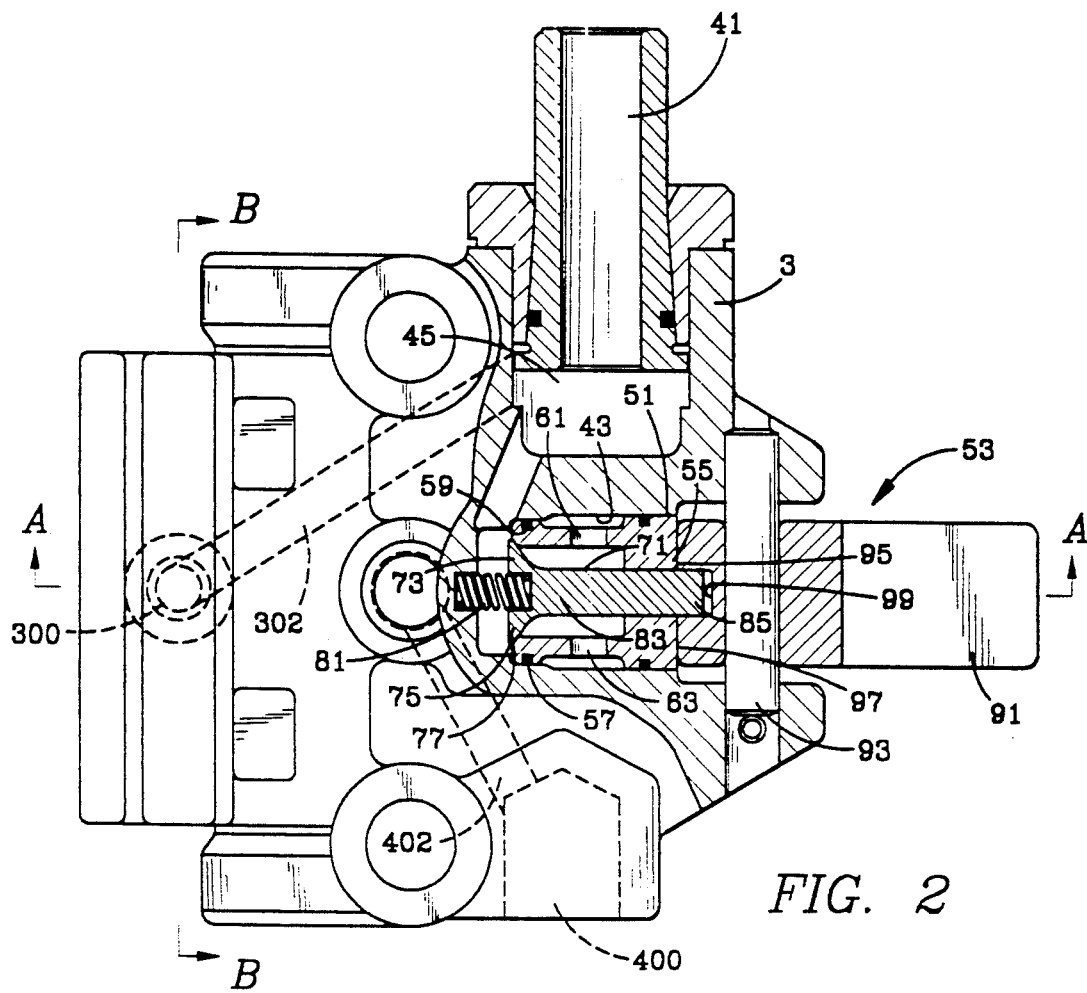
FIG. 2 is a top view, partially in cross section, with parts removed of the backhead of the jackhammer of FIG. 1.
Figure 3:
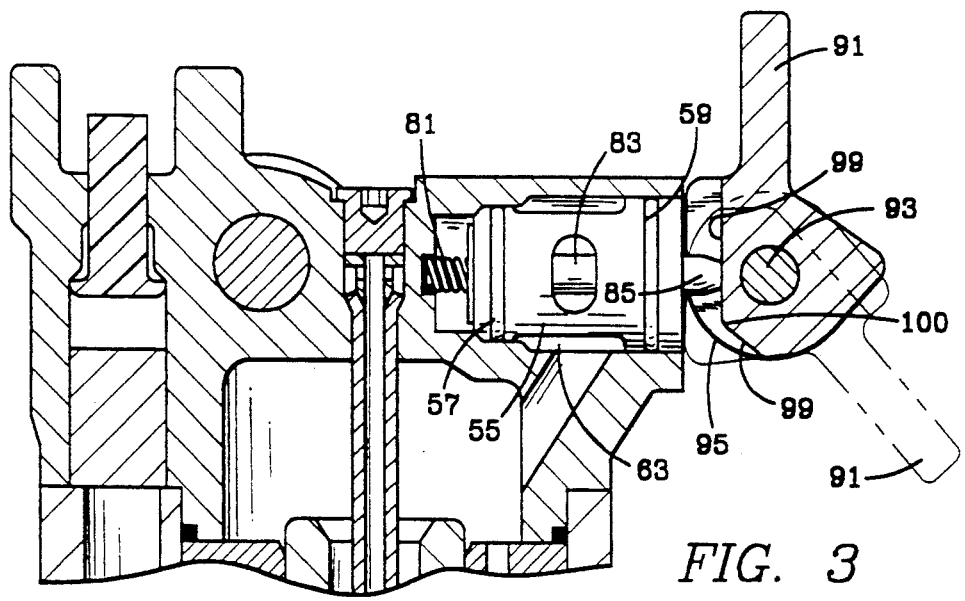
FIG. 3 is view, partially in cross section, with some parts shown in elevation, along A—A of FIG. 2.

Referring to FIGS. 2 and 3, a first throttle valve system for use with this invention is shown. Inlet port 41 carries percussive fluid into backhead 3. Passageway means in backhead 3, described hereinafter, provide fluid communication between inlet port 41 and central bore 9 of apparatus 1.

A first backhead bore 43 extends in backhead 3. On end of first backhead bore 43 is in fluid communication with inlet port 41 by way of passageway 45, and the other end of first backhead bore 43 extends to the outside atmosphere.

First seal means 51 is removably mounted in first backhead bore 43 in sealing contact with the sidewalls of first backhead bore 43. The purpose of first seal means 51 is to open and close the passageways between inlet port 41 and central bore 9 by opening and closing first backhead bore 43, in response to a first throttle means 53 mounted on backhead 3.

First seal means 51 includes a cylindrical valve cartridge housing 55 in fluid sealing contact with sidewalls of first backhead bore 43. Housing 55 is elastically mounted in first backhead bore 43 by means of elastic 0-rings 57 carried in grooves 59 in the outer surface of cartridge housing 55. Housing 55 is slidably inserted into first backhead bore 43, and requires some means for retention in first backhead bore 43, as described hereinafter. Housing 55 has an internal valve bore forming a valve chamber 61 therein. Apertures 63 in sidewalls of cartridge housing 55 fluidly communicate valve chamber 61 with central bore 9 by way of passageway 19 (FIG. 1).

Slidably extending through housing 55 is a valve stem 71 (FIG. 2). Valve stem 71 has a first valve stem end 73 with a head portion 75 in fluid sealing contact with a valve seat surface 77 in valve housing 55. Elastic spring means 81 seated between backhead 3 and valve head 75 biases valve stem 71 into a normally closed position, that is, into contact with seat surface 77.

Valve stem 71 has an elongated valve stem body 83 that extends through housing 55 to terminate in a second valve stem end 85 that extends outside valve housing 55 to contact first throttle means 53.

First throttle means 53 includes a throttle lever 91 pivotally mounted on backhead 3 above cartridge housing 55. Lever 91 can pivot about pivot pin axis 93. Lever 91 has a pair of spaced apart curved surfaces 95 and 97 in sliding contact with housing 55, to retain housing 55 in first backhead bore 43. Between curved surfaces 95 and 97 is a cam detent surface 99 that is in sliding contact with second valve stem end 85. Thus, it can be understood that as lever 91 is pivoted about axis 93, curved surfaces 95, 97 retain cartridge 55 in bore 43 and cam detent surface 99 permits valve stem 71 to move up and down in valve bore chamber 61 to open and close valve 51. I prefer to provide cam surface 99 with an apex 1 separating two cam surface portions, so as to provide a positive detent in both the on and off positions (FIG. 3). If desired, a plurality of cam surfaces 99, with an apex between each surface, can be provided to provide a plurality of valve opening settings, for added operator sensitivity and control.

Figure 7:
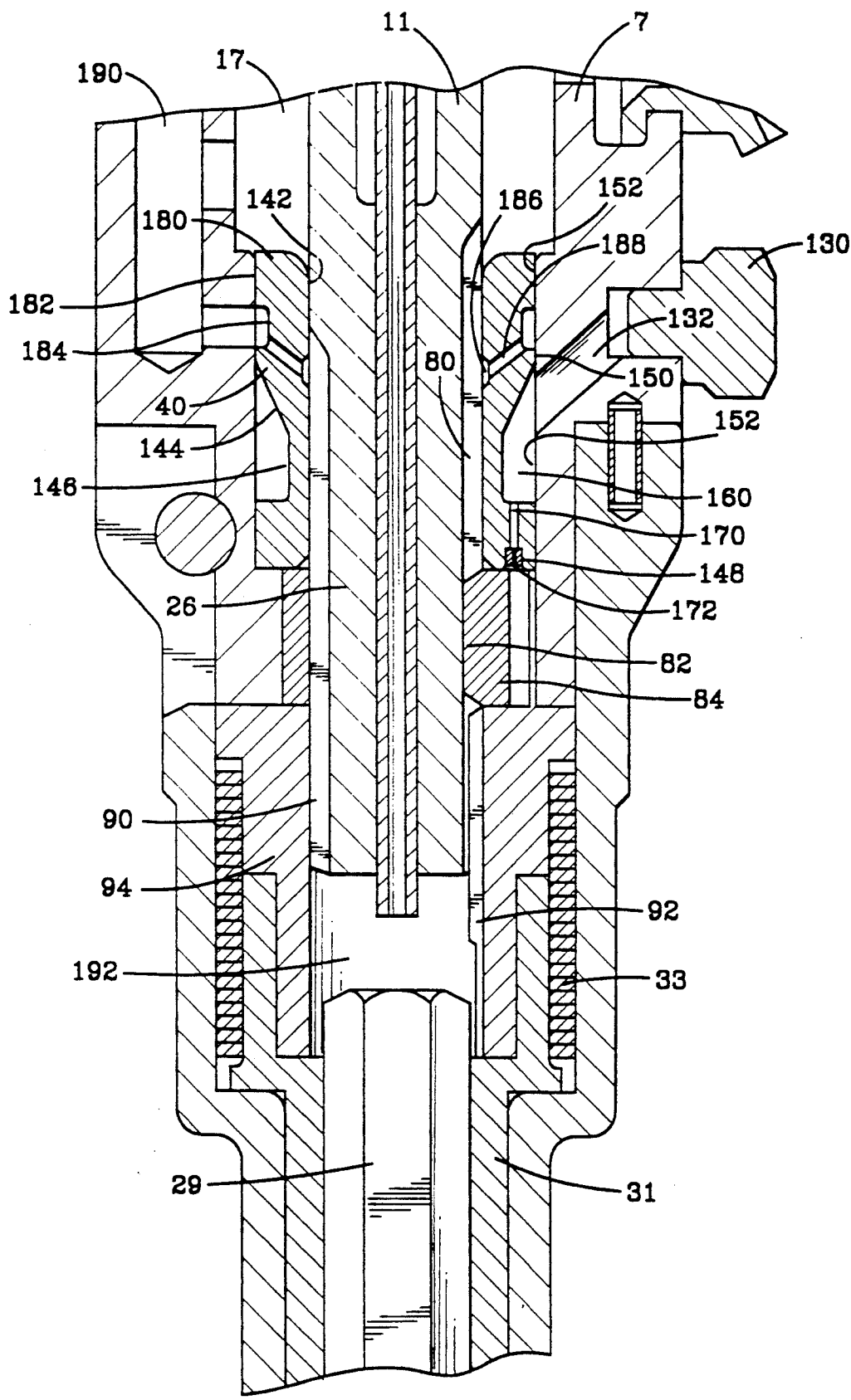
FIG. 7 is an expanded view of a piston stem bearing and passageways therein supporting a piston stem of the invention.

As seen in FIG. 7, the piston 11 is grounded from rotary motion through a series of longitudinal grooves 80 that extend downwardly along piston stem 26. As used herein, the terms "longitudinal" or "longitudinally" mean in a direction that is parallel to axis 13. Grooves 80 mate to splines 82 in a removable splined nut 84 that is non-rotatable, with respect to its surrounding housing (FIG. 1). Splines 82 are formed in an inner surface of nut 84 and extend longitudinally downwardly along the length of nut 84.

Figure 6:
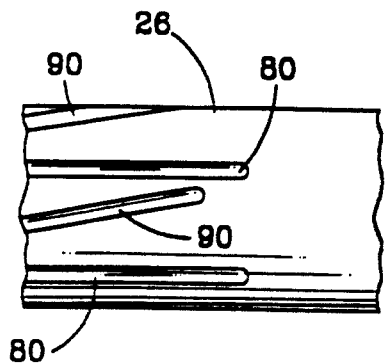
FIG. 6 is an isometric view, with parts removed, of a piston stem of the invention, showing grooves therein.

The piston 11 also has a series of helical grooves 90 (FIG. 6 and FIG. 1) which are connected to helical splines 92 in a helical nut 94. Helical grooves 90 extend downwardly along piston stem 26 and are located between said longitudinal grooves 80, preferably one helical groove 90 between each pair of adjacent longitudinal grooves 80. The helical action of the splines 82 causes the helical nut 94 to oscillate rotatably back and forth as the piston 11 reciprocates. The helical nut 94 is then frictionally attached to a uni-directional clutch mechanism, such as a wrap spring clutch 33, which drives the chuck 31 and drill steel 29. The wrap spring clutch mechanism is described in U.S. Pat. No. 5,139,093 issued to Leland H. Lyon et al and forms no part of this invention, but is incorporated herein for illustration purposes.

As shown in FIG. 7, lubrication for the jackhammer is provided by introducing a liquid lubricant, preferably oil, into the percussive air. Oil cap 130 threadably closes an oil inlet tube 132 in housing 7. The operator of the jackhammer introduces oil into inlet 132 at periodic intervals. Piston stem bearing 40 has an internal surface 142 that slidably contacts piston stem 26, and supports piston 11 for reciprocation along axis 13. Piston stem bearing 40 has an external surface 144 that forms an annular recessed portion 146 and a bottom flanged portion 148. Annular recess portion 146, at an upper land surface 150, contacts housing internal wall 152, in a fluid sealing contact. The combination of external surface 144 and housing wall 152 form an oil chamber 160. Oil chamber 160 can also be formed, in part or in whole, by a recess in an internal surface of housing 152. Oil chamber 160 communicates with inlet tube 132, to carry oil into chamber 160. An oil feed aperture 170 extends through bottom flange 148 and forms an internal recess for a metering element 172, such as a removable, porous, sintered, metallic plug. Oil feed aperture 170 and metering element 172 provide a passageway for oil to enter into the bore of the jackhammer in the area of the removable splined nut 84. Bottom flange 148 also contacts the internal wall of housing 7 in a fluid sealing contact.

The passageways described so far are referred to herein as the first debris flushing, and such system includes first passageway means, first seal means and first throttle means. The passageways forming this first flushing system are the preferred arrangement. Other designs of passageways will work, so long as the piston is operatively reciprocated, the percussive fluid is exhausted, and the drill steel is impacted and rotated.

In operation, the first debris flushing system of this jackhammer operates as follows: As the return chamber 17 exhausts, a portion of the exhaust enters the front piston chamber 192 in front of piston 11, by way of longitudinal grooves 80 in piston stem 26 (FIG. 7). There, such exhaust combines with percussive fluid transmitted down through the center bore 12 of piston 11 from first accumulator chamber 23 in the backhead 3 of the jackhammer, as shown by arrows 202 in FIG. 1.

The second debris flushing system and its associated throttle means will now be described. Such second debris flushing system is independent and separate from the first debris flushing system heretofore described. As shown in FIG. 7, top end 180 of piston stem bearing 40, in a location that is spaced above upper land surface 150, contacts the internal surface 182 of housing 86 in a second fluid sealing contact. Between top end 180 and upper land 150 is a first circumferential groove 184 in external surface 144 that communicates with a second circumferential groove 186 in internal surface 142 of piston stem bearing 40 by way of a plurality of holes 188 spaced circumferentially around piston stem bearing 40. First groove 184 communicates with an external passageway 190 provided in housing 7, for flushing fluid to pass into front piston chamber 192 and out around drill steel 29 by way of holes 188 in bearing 40 and grooves 90 or 80 in piston stem 26, for flushing debris from the drillhole.

Figure 4:
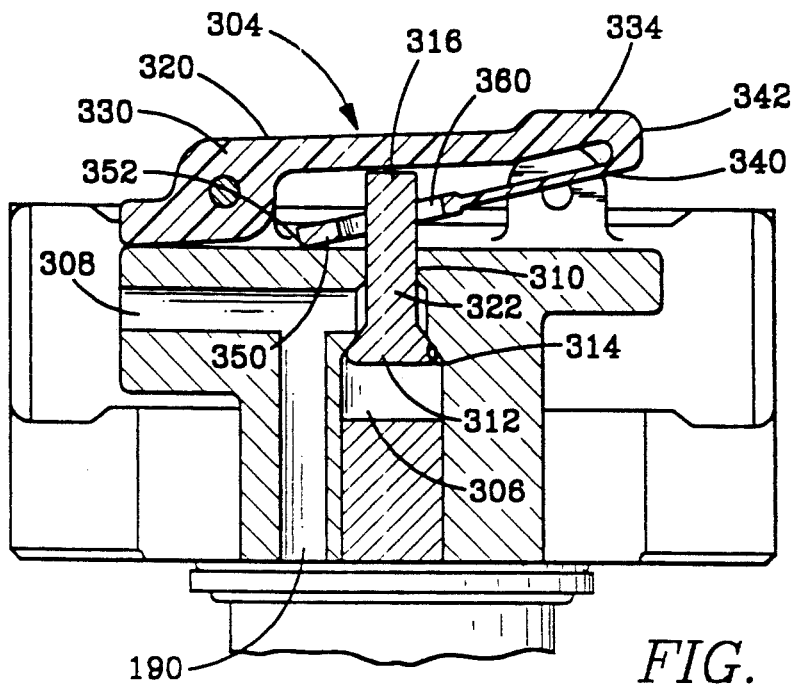
FIG. 4 is a view, partially in cross section, with parts removed, along B—B of FIG. 2.

Now referring to FIGS. 2 and 4, the inlet portion, the sealing means and the throttle means for the second flushing system are shown. Inlet port 41 is in fluid communication with second accumulator chamber 300 by way of passageway 302 in backhead 3, and ultimately, to front piston chamber 192 by way of external passageway 190, as described hereinabove. Second accumulator chamber 300 is external to first accumulator chamber 23. Second seal means 304 includes a second backhead bore 306 in fluid communication with inlet port 41 at a first end. The second end of second backhead bore 306 extends to the outside atmosphere (FIG. 4). Connecting passageway 308 provides fluid communication between second backhead bore 306 and external housing passageway 190. A second valve stem means 310 is slidable in second backhead bore 306 for opening and closing connecting passageway 308.

Second valve stem means 310 includes a first stem end 312 in fluid sealing contact with a seal seat surface 314 on a sidewall of second backhead bore 306, and a second stem end 316 extending outside of second backhead bore 306 for contact with a second throttle means 320, described hereinafter. Stem body 322 may or may not have an elastic o-ring seal means for fluidly sealing stem body 322 in second backhead bore 306. Stem means 310 is normally biased into a closed position into contact with seal surface 314 by the pressure of fluid in second accumulator chamber 306, although a bias spring means can also be inserted, similar to spring means 81.

Referring to FIG. 4, the throttle means 320 is shown to include a throttle lever 330 elastically and pivotally mounted on a pivot pin 332 on backhead 3, said lever 330 being cantilevered from pivot pin 332 to extend above second valve stem end 316. Throttle lever 330 includes an elongated upper contact arm 334 pivotally connected at one end to pivot pin 332. Arm 334 extends substantially horizontally in a first direction to an end portion that reverses itself to then form an elongated second section, called herein a spring arm 340. Spring arm 340 extends downwardly in a second direction, opposite to that of contact arm 334, and is spaced below contact arm 334. Spring arm 340 and contact arm 334 are elastically connected to each other by an intermediate portion 342. Spring arm 340 has an end 350 terminating in elastic contact with a contact surface 352 on backhead 3. Spring arm 340 has an aperture 360 therein for permitting second piston stem end 316 to pass therethrough for contact with a bottom surface of upper contact arm 334.

Throttle lever 330 is preferred to be of a one-piece elastic, material, such as a high impact thermoplastic material. Thus, it can be understood that lever 330 is operated by the operator pressing on upper contact arm 334 to elastically depress lever 330 until second stem end 316 is depressed, thereby opening second seal means 304. This open position permits flushing fluid to flow through the second flushing system of the apparatus, in a series of passageways that are independent and separate from the passageways used to operate the piston 11 and the normal flushing system of the jackhammer, as shown by the arrows 200 in FIG. 1. The second flushing system can be used with or without the operative percussive fluid system.

Figure 5:
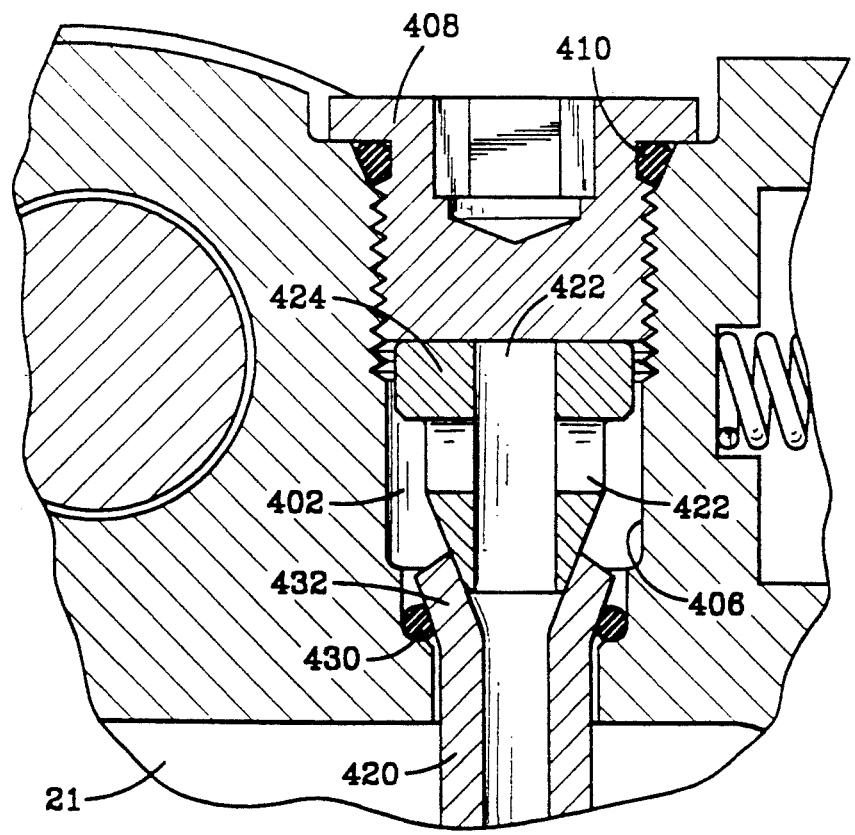
FIG. 5 is an expanded view of the circled portion of FIG. 1.

Now referring to FIGS. 2 and 5 the water flushing system of this invention will be described Water is introduced into second fluid inlet port 400 and flows to third accumulator chamber 402 in backhead 3. Third accumulator chamber 402 is external to first and second accumulator chambers 21 and 300. Third accumulator chamber 402 includes a forth backhead bore 406 that is open to the external atmosphere at one end, and that opens into first accumulator chamber 21 on the other end. Bore 406 is normally closed by a threadable closure 408 and elastic o-ring 410 therein. A hollow, tubular fluid conduit 420 extends from third accumulator chamber 402 into a central bore 12 of piston 11. Water in third accumulator chamber 402 flows into the conduit 420 by way of apertures 422 in the distributor 424 in forth backhead bore 406. Conduit 420 is sealingly positioned in third accumulator bore 406 by means of elastic o-ring 430, between flared end 432 of conduit 422 and fourth backhead bore 406. Distributor 424 forces flared end 432 into sealing contact due to the urging of threaded closure member 408.

Thus, it can be understood that water can flow into backhead 3, into and through piston bore 12 and into front piston chamber 190, to provide a third flushing system for the jackhammer. This third flushing system can be opened and closed by a valve in the water system external to the jackhammer. Also, the second inlet means 400 can be disconnected from the water source. In this case, the backhead 3 closed with a solid distributor 424 that has no apertures 422 therein, so that the internal passageways of the jackhammer are not opened to the atmosphere in this location. Also, in this case, the conduit 420 can be removed altogether, to open the bore 12 through piston 11 completely for flow of flushing fluid therethrough. With conduit 420 in bore 12 percussive fluid flow is substantially closed off, or at best, there is a small amount of residual percussive fluid flow around the external surface of conduit 420 in an amount that is not effective for flushing debris.

Having described the invention, what is claimed is:

1. A debris flushing system in a percussive, fluid-activated drilling apparatus, said apparatus having a backhead at a top end, a fronthead at a bottom end, a housing therebetween forming a central bore having therein a drive chamber and a return chamber for reciprocating a piston, said central bore having therein a front piston chamber for receiving and exhausting a flushing fluid, said flushing system comprising:
 a. a first fluid inlet port in said backhead;
 b. a first fluid flushing system in said apparatus for fluid communication between said inlet port, said drive chamber and said return chamber to reciprocate said piston, and for fluid communication with said front piston chamber;
 c. a second fluid flushing system in said apparatus for fluid communication between said inlet port and a passageway having a portion positioned in said housing external to said central bore, said external portion bypassing said drive chamber and said return chamber, said passageway communicating with said central bore at a position between said return chamber and said front piston chamber and thereafter communicating with said front piston chamber; and
 d. said first and second fluid flushing systems each including means for independently starting and stopping fluid flow therein, whereby said first and second fluid flushing systems are separate and independent from each other.

2. The flushing system of claim 1 wherein said first fluid flushing system comprises:
 a. first passageway means in said apparatus for fluid communication with said inlet port and said front piston chamber;
 b. first seal actuator means for opening and closing said first passageway means; and
 c. first throttle means for opening and closing said first seal actuator means.

3. The flushing system of claim 2 wherein said second fluid flushing system comprises:
 a. second passageway means in said apparatus for fluid communication between said inlet port and said front piston chamber;
 b. second seal actuator means for opening and closing said second passageway means; and
 c. second throttle means for opening and closing said second seal actuator means.

4. A debris flushing system in a percussive, fluid-activated drilling apparatus, said apparatus having a backhead at a top end, a front head at a bottom end, a housing therebetween forming a central bore having therein a drive chamber and a return chamber for reciprocating a piston, said central bore having therein a front piston chamber for receiving and exhausting a flushing fluid, said flushing system comprising:
   a. a first fluid inlet port in said backhead;
   b. first passageway means in said apparatus for fluid communication between said inlet port and said front piston chamber;
   c. first seal actuator means for opening and closing said first passageway means;
   d. first throttle means for opening and closing said first seal actuator means;
   e. second passageway means in said apparatus for fluid communication between said inlet port and said front piston chamber;
   f. second seal actuator means for opening and closing said second passageway means;
   g. second throttle means for opening and closing said second seal actuator means;
   h. said first passageway means further comprising:
      (i), a first accumulator chamber within said central bore at said backhead, in fluid communication with said inlet port and said drive and return chambers, for receiving percussive fluid to activate said piston and
      (ii), a bore through said piston in fluid communication between said first accumulator chamber and said front piston chamber, whereby a portion of percussive fluid in said first accumulator chamber flows to said front piston chamber;
   i. said second passageway means further comprising:
      (i), a second accumulator chamber in said backhead, said second accumulator chamber being external to said central bore, in fluid communication with said inlet port; and
      (ii), housing passageway means in said housing in fluid communication with said second accumulator chamber and said front piston chamber, whereby a portion of percussive fluid in said inlet port can flow to said front piston chamber;
   j. said firs seal actuator means further comprising:
      (i), a first backhead bore in said backhead in fluid communication with said first inlet port;
      (ii), a valve cartridge housing in fluid sealing contact in said first backhead bore;
      (iii), valve cartridge passageway means through said valve cartridge housing, for fluid communication between said first inlet port and said first backhead bore; and
      (iv), first valve stem means in said valve cartridge housing for opening and closing said valve cartridge passageway means, in response to said fires throttle means; and
   k. said second seal actuator means further comprising:
      (i). a second backhead bore through said backhead in fluid communication with said first inlet port;
      (ii). a connecting passageway in said second backhead for fluid communication between said second backhead bore and said housing passageway means; and
      (iii). second valve stem means slidable in said second backhead bore, for opening and closing said connecting passageway.

5. The flushing system of claim 4 wherein said second valve stem means comprises:
   a. a first stem end in sealing contact with a seal seat surface on a sidewall of said second backhead bore;
   b. a second stem end extending outside of said second backhead bore for contact with said second throttle means.

6. The flushing system of claim 4 wherein said valve cartridge housing is removably mounted in said first backhead bore.

7. The flushing system of claim 6 wherein said valve cartridge housing is elastically mounted in said first backhead bore against a plurality of elastic O-rings.

8. The flushing system of claim 7 further comprising:
   a. elastic bias means in said first backhead bore for biasing said first valve stem means into a normally closed position.

9. The flushing system of claim 4 wherein said first valve stem means further comprises:
   a. a first valve stem end in fluid sealing contact with said valve cartridge housing when said valve cartridge passageway means is closed and out of contact with said valve cartridge housing when said valve cartridge passageway means is open;
   a second valve stem end extending outside of said valve cartridge housing and in contact with said first throttle means; and
   c. an elongated valve stem body therebetween, said valve stem body reciprocal in said valve cartridge housing between an open and closed position.

10. The flushing system of claim 9 wherein said first throttle means comprises:
   a. a throttle lever pivotally mounted on said backhead about a pivot pin spaced above said valve cartridge housing;
   b. curved contact surface means on said throttle lever, in slidable contact with an upper end of said valve cartridge housing, for retaining said valve cartridge housing in said backhead bore, as said throttle lever is pivoted about said pivot pin; and
   c. cam detent contact surface means on said throttle lever, in slidable contact with said second valve stem end, for permitting said valve stem to reciprocate back and forth in said valve cartridge housing, as said throttle lever is pivoted about said pivot pin.

11. The flushing system of claim 4 further comprising:
   a. a second fluid inlet port in said backhead; and
   b. third passageway means in said apparatus for fluid communication between said second inlet port and said front piston chamber.

12. The flushing system of claim 11 wherein said third passageway means comprises:
   a. a third accumulator chamber in said backhead, said third accumulator chamber being external to said first and second accumulator chambers, said third accumulator chamber in fluid communication with said second inlet port;
   b. a hollow tubular fluid conduit member extending from said third accumulator chamber through said first accumulator chamber and into said bore of said piston, whereby fluid is conducted into said front piston chamber from said second inlet port; and
   c. means on said conduit member for removably connecting said conduit member to said backhead.

13. The invention of claim 12 wherein said first inlet port is adapted to transmit a percussive gas, and said second inlet port is adapted to transmit a flushing liquid.

* * * * *